US012567780B2

(12) United States Patent
Kawahara et al.

(10) Patent No.: US 12,567,780 B2
(45) Date of Patent: Mar. 3, 2026

(54) DRIVE UNIT HAVING AN AUXILIARY ELECTRIC MOTOR FOR SUPPLEMENTARILY OUTPUTTING A TORQUE

(71) Applicant: EXEDY Corporation, Neyagawa (JP)

(72) Inventors: Yuki Kawahara, Neyagawa (JP); Misaki Minoha, Neyagawa (JP); Hitoshi Terabayashi, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 380 days.

(21) Appl. No.: 18/452,660

(22) Filed: Aug. 21, 2023

(65) Prior Publication Data

US 2024/0097526 A1 Mar. 21, 2024

(30) Foreign Application Priority Data

Sep. 20, 2022 (JP) ................................. 2022-149040

(51) Int. Cl.
| *H02K 7/10* | (2006.01) |
| *B60K 1/02* | (2006.01) |
| *H02K 7/00* | (2006.01) |
| *H02K 11/30* | (2016.01) |

(52) U.S. Cl.
CPC ................. *H02K 7/10* (2013.01); *B60K 1/02* (2013.01); *H02K 7/006* (2013.01); *H02K 11/30* (2016.01)

(58) Field of Classification Search
CPC . B60K 1/02; H02K 7/006; H02K 7/10; H02K 11/30
USPC .......................................................... 310/75
See application file for complete search history.

(56) References Cited

U.S. PATENT DOCUMENTS

| 6,026,921 | A | * | 2/2000 | Aoyama | ................ | B60W 10/02 |
| | | | | | | 903/918 |
| 6,278,915 | B1 | * | 8/2001 | Deguchi | ................ | B60K 6/543 |
| | | | | | | 701/87 |
| 9,370,992 | B2 | * | 6/2016 | Holmes | ................... | F02N 11/04 |
| 11,859,704 | B2 | * | 1/2024 | Wang | .................... | B60K 23/04 |
| 2007/0023211 | A1 | * | 2/2007 | Keller | ................. | B60K 17/356 |
| | | | | | | 180/65.6 |
| 2011/0024208 | A1 | * | 2/2011 | Wust | ........................ | B60K 6/48 |
| | | | | | | 180/65.21 |

(Continued)

FOREIGN PATENT DOCUMENTS

JP 2006160096 A 6/2006

*Primary Examiner* — Rashad H Johnson

(74) *Attorney, Agent, or Firm* — United IP Counselors, LLC

(57) ABSTRACT

A drive unit is configured to prevent an auxiliary electric motor from being rotated, which could otherwise cause the back electromotive voltage thereof to exceed the maximum rated voltage. The drive unit includes a drive source, a shaft, an auxiliary electric motor, and a clutch. The shaft is configured to transmit a torque outputted from the drive source. The clutch is disposed between the shaft and the auxiliary electric motor. The clutch is configured to allow transmission of a mechanical power from the auxiliary electric motor to the shaft regardless of whether the mechanical power is intended for forward rotation or reverse rotation, while being configured to block transmission of the torque from the shaft to the auxiliary electric motor regardless of whether the torque is intended for forward rotation or reverse rotation.

11 Claims, 7 Drawing Sheets

(56) References Cited

U.S. PATENT DOCUMENTS

| | | | |
|---|---|---|---|
| 2013/0332014 A1* | 12/2013 | Jackson | B60L 50/51 |
| | | | 701/22 |
| 2014/0004987 A1* | 1/2014 | Sato | B60K 17/06 |
| | | | 475/150 |
| 2014/0083246 A1* | 3/2014 | Venturi | B60K 6/36 |
| | | | 903/902 |
| 2015/0266466 A1* | 9/2015 | Johri | B60W 30/188 |
| | | | 180/65.265 |
| 2018/0043788 A1* | 2/2018 | Kuribara | B60L 8/003 |
| 2018/0244258 A1* | 8/2018 | Mouri | B60W 10/107 |
| 2019/0301577 A1* | 10/2019 | Harada | F16H 61/0213 |
| 2019/0346031 A1* | 11/2019 | Goretzki | H02K 7/10 |
| 2021/0107448 A1* | 4/2021 | Nose | B60K 13/04 |
| 2022/0176965 A1* | 6/2022 | Gesang | B60W 10/06 |
| 2022/0227349 A1* | 7/2022 | Aratake | B60W 20/20 |
| 2024/0097526 A1* | 3/2024 | Kawahara | H02K 7/10 |
| 2024/0424879 A1* | 12/2024 | Le | B60K 1/00 |
| 2025/0313200 A1* | 10/2025 | Matsuoka | B60W 30/143 |

* cited by examiner

DRIVE UNIT HAVING AN AUXILIARY ELECTRIC MOTOR FOR SUPPLEMENTARILY OUTPUTTING A TORQUE

CROSS-REFERENCE TO RELATED APPLICATIONS

This application is based on and claims the priority benefit of Japanese patent application 2022-149040 filed Sep. 20, 2022, the contents of which are incorporated herein by reference.

BACKGROUND OF THE INVENTION

1. Field of the Invention

The present invention relates to a drive unit.

2. Description of the Related Art

There has been proposed a type of drive unit including not only a drive source such as an electric motor or engine but also an auxiliary electric motor supplementarily outputting a torque. For example, Japan Laid-open Patent Application Publication No. 2006-160096 discloses a drive apparatus that includes an engine and an auxiliary electric motor and in which the engine mainly functions as a drive source, while the auxiliary electric motor assists a torque outputted from the engine.

In such a drive unit as described above, when the drive source rotates at a high speed, the rotation of the drive source is transmitted to the auxiliary electric motor, whereby the auxiliary electric motor is rotated at a high speed; as a result, there is a concern that the back electromotive voltage of the auxiliary electric motor undesirably exceeds the maximum rated voltage thereof It is an object of the present invention to prevent an auxiliary electric motor from being rotated such that the back electromotive voltage thereof exceeds the maximum rated voltage thereof.

SUMMARY OF THE INVENTION

A drive unit according to a first aspect includes a drive source, a shaft, an auxiliary electric motor, and a clutch. The shaft is configured to transmit a torque outputted from the drive source. The clutch is disposed between the shaft and the auxiliary electric motor. The clutch is configured to allow transmission of mechanical power from the auxiliary electric motor to the shaft regardless of whether the mechanical power is intended for forward rotation or reverse rotation, while being configured to block transmission of torque from the shaft to the auxiliary electric motor regardless of whether the torque is intended for forward rotation or reverse rotation.

According to this configuration, even when the drive source is rotated at such a rotational speed that that the back electromotive voltage of the auxiliary electric motor exceeds the maximum rated voltage thereof, the clutch does not transmit the rotation of the drive source to the auxiliary electric motor. As a result, the auxiliary electric motor can be prevented from being rotated such that the back electromotive voltage thereof exceeds the maximum rated voltage thereof A drive unit according to a second aspect relates to the drive unit according to the first aspect and is configured as follows. The drive source is a main electric motor.

A drive unit according to a third aspect relates to the drive unit according to the second aspect and is configured as follows. The auxiliary electric motor has characteristics of being lower in maximum rotational speed and larger in maximum torque than the main electric motor.

A drive unit according to a fourth aspect relates to the drive unit according to any of the first to third aspects and is configured as follows. The auxiliary electric motor is disposed to be coaxial to the drive source.

A drive unit according to a fifth aspect relates to the drive unit according to any of the first to third aspects and is configured as follows. The auxiliary electric motor is disposed not to be coaxial to the drive source.

A drive unit according to a sixth aspect relates to the drive unit according to any of the first to fifth aspects and further includes a controller. The controller is configured to control the drive source and the auxiliary electric motor. The controller drives at least the auxiliary electric motor when a vehicle speed is less than or equal to a threshold. Besides, the controller drives the drive source, while stopping the auxiliary electric motor, when the vehicle speed is greater than the threshold. It should be noted that "stopping the auxiliary electric motor" means stopping energy supply to the auxiliary electric motor.

A drive unit according to a seventh aspect relates to the drive unit according to any of the first to fifth aspects and further includes a controller. The controller is configured to control the drive source and the auxiliary electric motor. The controller drives the drive source and the auxiliary electric motor when a vehicle speed is less than or equal to a first threshold. Besides, the controller drives the drive source, while stopping the auxiliary electric motor, when the vehicle speed is greater than the first threshold. Moreover, the controller stops the drive source, while driving the auxiliary electric motor, when the vehicle speed is less than or equal to a second threshold less than the first threshold and simultaneously when a required torque is less than or equal to a third threshold. It should be noted that "stopping the drive source" means stopping energy supply to the drive source; besides, the drive source may be rotated by the torque of the auxiliary electric motor.

A drive unit according to an eighth aspect relates to the drive unit according to any of the first to seventh aspects and is configured as follows. The clutch includes an input rotary member, an output rotary member, and a transmission member. The input rotary member is configured to receive the torque that has been input thereto from the auxiliary electric motor. The output rotary member is configured to output the torque to the shaft. The output rotary member is disposed radially away from the input rotary member at an interval. The transmission member is disposed between the input rotary member and the output rotary member. The transmission member is configured to be set in a disengaged state as well as an engaged state. The transmission member produces a gap together with the output rotary member therebetween when set in the disengaged state. The transmission member is in mesh between the input rotary member and the output rotary member when set in the engaged state. The transmission member is set in the engaged state when the input rotary member is rotated relative thereto.

A drive unit according to a ninth aspect relates to the drive unit according to the eighth aspect and is configured as follows. The clutch includes an urging member urging the transmission member such that the transmission member is set in the disengaged state.

A drive unit according to a tenth aspect relates to the drive unit according to the eighth or ninth aspect and is configured as follows. The clutch includes a holding member disposed between the input rotary member and the output rotary member. The holding member is disposed to be rotatable relative to the input rotary member and the output rotary member. The holding member holds the transmission member.

Overall, according to the present invention, the auxiliary electric motor can be prevented from being rotated such that the back electromotive voltage thereof exceeds the maximum rated voltage thereof.

DETAILED DESCRIPTION OF PREFERRED EMBODIMENTS

A drive unit according to a preferred embodiment of the claimed invention will be hereinafter explained with reference to drawings.

<Drive Unit>

Figure 1:
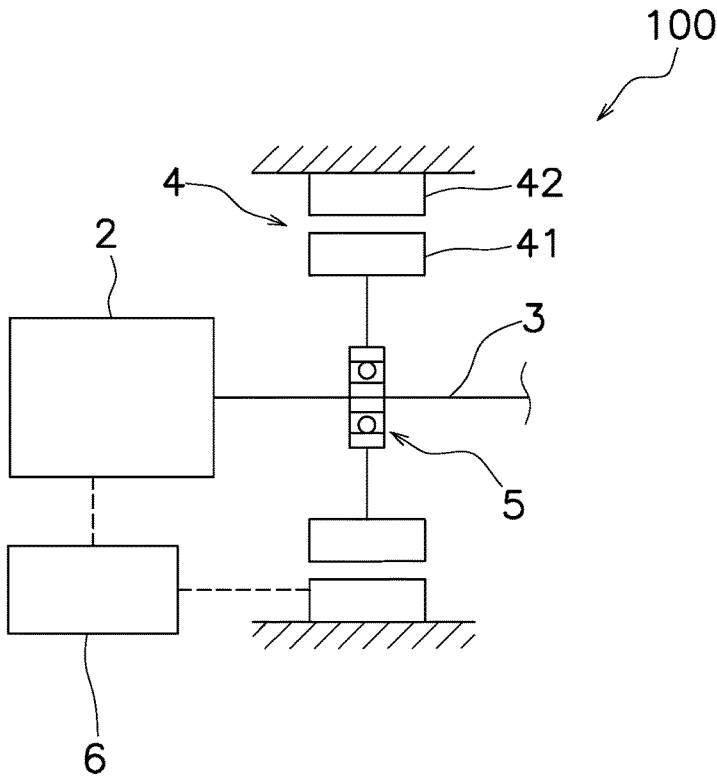
FIG. 1 is a schematic diagram of a drive unit.

As shown in FIG. 1, a drive unit 100 includes a main electric motor 2 (exemplary drive source), a shaft 3, an auxiliary electric motor 4, a clutch 5, and a controller 6. The drive unit 100 is configured to drive drive wheels (not shown in the drawings). The drive unit 100 may be installed, for instance, in an electric car, a hybrid car, or so forth.

<Main Electric Motor>

The main electric motor 2 is configured to output a torque used to drive forward rotation as well as reverse rotation of the drive wheels. It should be noted that the term "forward rotation" means rotation of respective members caused in forward movement of the vehicle in which the drive unit 100 is installed. In other words, when the main electric motor 2 outputs the torque used for forward rotation, the respective members are forwardly rotated, whereby the vehicle is moved forward. By contrast, the term "reverse rotation" means rotation of the respective members caused in rearward movement of the vehicle in which the drive unit 100 is installed. In other words, when the main electric motor 2 outputs the torque used for reverse rotation, the respective members are reversely rotated, whereby the vehicle is moved rearward.

<Shaft>

The shaft 3 is disposed to be rotatable. The shaft 3 is attached directly or indirectly to the main electric motor 2. It should be noted that in the present preferred embodiment, the shaft 3 is disposed to be coaxial to the main electric motor 2. The shaft 3 receives the torque inputted thereto from the main electric motor 2. Then, the shaft 3 transmits the torque, inputted thereto from the main electric motor 2, to a drive wheel side.

<Auxiliary Electric Motor>

The auxiliary electric motor 4 is configured to output torque to the shaft 3 used to drive forward rotation as well as to drive reverse rotation. The auxiliary electric motor 4 includes a rotor 41 and a stator 42. The stator 42 is fixed to a frame or so forth. The auxiliary electric motor 4 is disposed to be coaxial to the main electric motor 2. In other words, the auxiliary electric motor 4 has a rotational axis arranged to be coaxial to that of the main electric motor 2.

Figure 2:
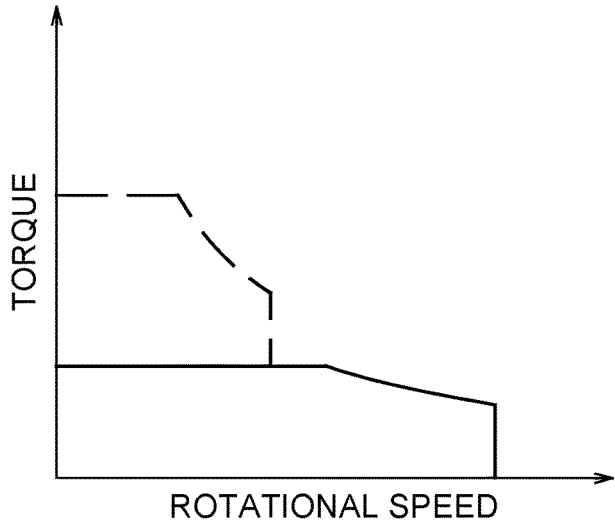
FIG. 2 is a chart showing characteristics of a main electric motor and an auxiliary electric motor.

The auxiliary electric motor 4 is configured to output the torque used for forward rotation or reverse rotation to at least one drive wheel through the shaft 3. FIG. 2 is a graph showing torque characteristics of the main electric motor 2 and the auxiliary electric motor 4. In FIG. 2, the solid line indicates the torque characteristics of the main electric motor 2, whereas the broken line indicates those of the auxiliary electric motor 4.

As shown in FIG. 2, the auxiliary electric motor 4 has characteristics of being lower in maximum rotational speed and larger in maximum torque than the main electric motor 2. In other words, the auxiliary electric motor 4 is suitable for outputting the torque used in a low speed range.

<Clutch>

As shown in FIG. 1, the clutch 5 is attached between the shaft 3 and the auxiliary electric motor 4. The clutch 5 is configured to allow transmission of mechanical power from the auxiliary electric motor 4 to the shaft 3 regardless of whether the mechanical power is used to drive forward rotation or reverse rotation, while being configured to block transmission of torque from the shaft 3 to the auxiliary electric motor 4 regardless of whether the torque is used to drive forward rotation or reverse rotation. In other words, the clutch 5 is configured to be set in a transmission-allowed state or a transmission-blocked state.

Figure 3:
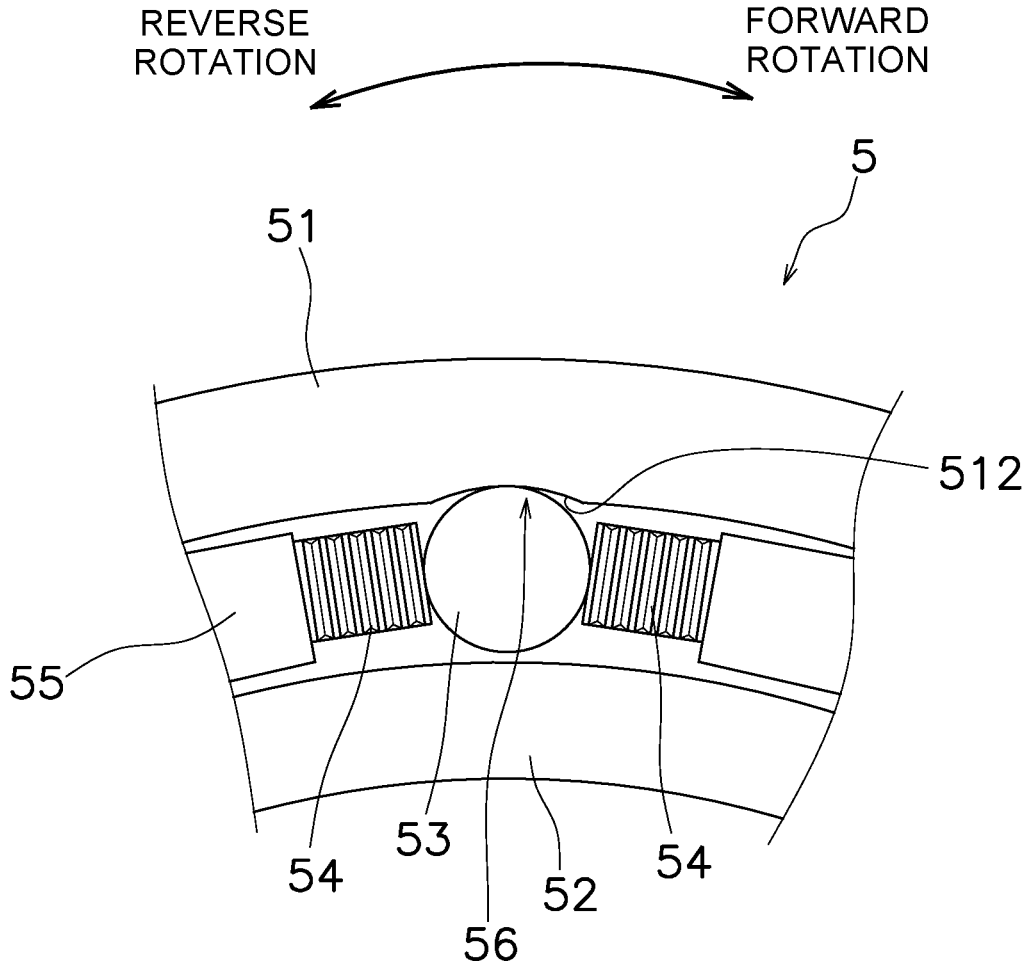
FIG. 3 is a closeup view of a clutch set in a transmission-blocked state.

FIG. 3 is a closeup view of the clutch 5 set in the transmission-blocked state. It should be noted that in the following explanation, the term "axial direction" means an extending direction of a rotational axis of the clutch 5. On the other hand, the term "radial direction" means a radial direction of an imaginary circle about the rotational axis of the clutch 5, whereas the term "circumferential direction" means a circumferential direction of the imaginary circle about the rotational axis of the clutch 5.

As shown in FIG. 3, the clutch 5 includes an outer race 51 (exemplary input rotary member), an inner race 52 (exemplary output rotary member), a plurality of rollers 53 (exemplary transmission members), a plurality of pairs of urging members 54, a holding member 55, and a cam mechanism 56.

<Outer Race>

The outer race 51 has an annular shape. The outer race 51 is disposed radially outside the inner race 52. The outer race 51 is rotatable about the rotational axis. Besides, the outer race 51 is rotatable relative to the inner race 52. The outer race 51 receives the torque that has been input to it from the auxiliary electric motor 4. The outer race 51 is attached to an auxiliary electric motor -side member. It should be noted that the outer race 51 is directly or indirectly attached to the rotor 41 of the auxiliary electric motor 4.

The outer race 51 is provided with a plurality of cam surfaces 512 on the inner peripheral surface thereof The respective cam surfaces 512 are provided at intervals in the circumferential direction. Preferably, the respective cam surfaces 512 are disposed at equal intervals in the circumferential direction.

Each cam surface 512 is shaped to be recessed radially outward. Each cam surface 512 is located the farthest from the inner peripheral surface of the inner race 52 at a circumferentially middle part thereof. Besides, each cam surface 512 is shaped to gradually approach the inner race 52 from the circumferentially middle part thereof to both circumferential ends thereof. Specifically, each cam surface 512 has a circular-arc shape as seen in the axial direction.

<Inner Race>

The inner race 52 is disposed radially away from the outer race 51 at an interval. Specifically, the inner race 52 is disposed radially inside the outer race 51. The inner race 52 is attached to a drive wheel-side member. Specifically, the inner race 52 is attached to the shaft 3. The inner race 52 is configured to output the torque to the shaft 3. The inner race 52 is rotatable about the rotational axis. The inner race 52 is rotatable relative to the outer race 51.

<Holding Member>

The holding member 55 is disposed between the outer race 51 and the inner race 52. The holding member 55 holds the respective rollers 53 and the respective urging members 54. The holding member 55 is disposed to be rotatable relative to the outer race 51 and the inner race 52.

<Roller>

The rollers 53 are held by the holding member 55. Specifically, each roller 53 is held by the holding member 55 through each pair of urging members 54. Each roller 53 is made in shape of a cylinder extending in the axial direction. The rollers 53 are disposed radially between the outer race 51 and the inner race 52.

Each roller 53 is enabled to be set in a disengaged state and an engaged state. As shown in FIG. 3, the term "disengaged state" means a state that each roller 53 is spaced from, and therefore not engaged with, the inner race 52 therebetween. In other words, when set in the disengaged state, each roller 53 is not in mesh between the outer race 51 and the inner race 52. Specifically, when set in the disengaged state, each roller 53 is located on the circumferentially middle part of each cam surface 512.

Figure 4:
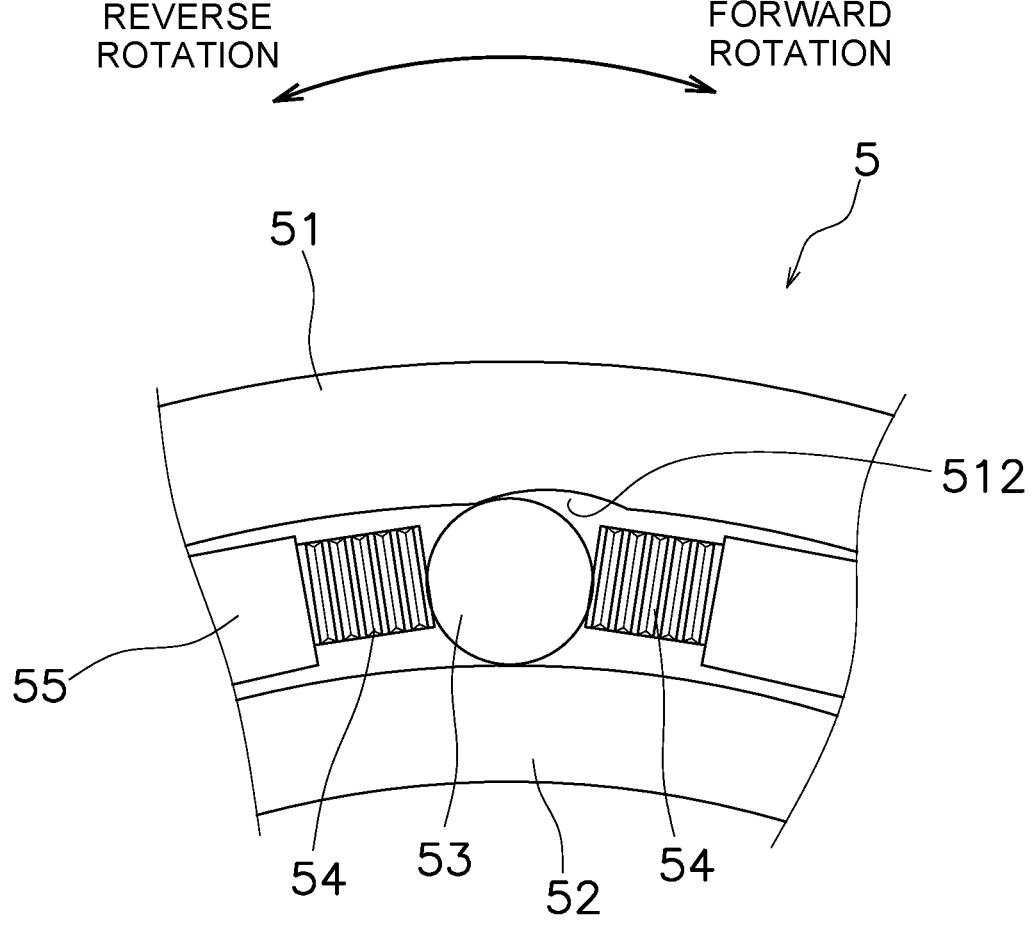
FIG. 4 is a closeup view of the clutch set in a transmission-allowed state.
Figure 5:
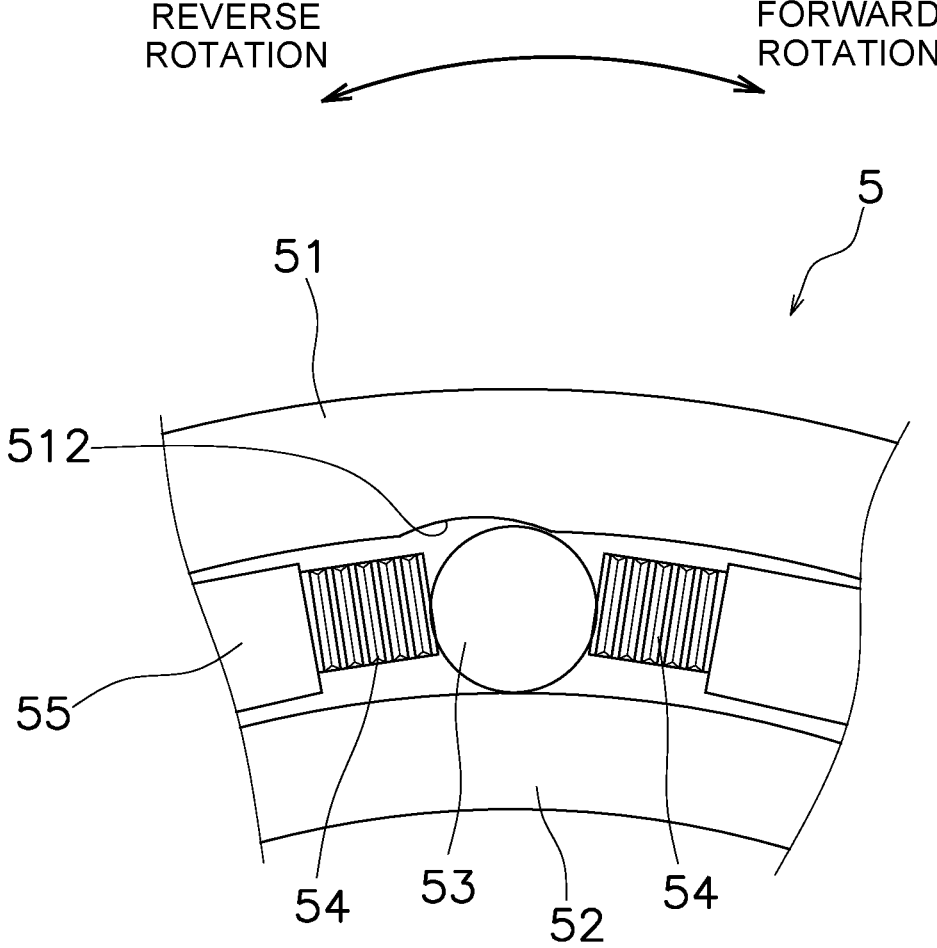
FIG. 5 is a closeup view of the clutch set in the transmission-allowed state.

As shown in FIGS. 4 and 5, the term "engaged state" means a state in which each roller 53 is in mesh between the outer race 51 and the inner race 52. Specifically, when set in the engaged state, each roller 53 is located in a position shifted from the middle part of each cam surface 512 to either of the ends of each cam surface 512. It should be noted that when each roller 53 is set in the engaged state, the clutch is in the transmission-allowed state.

[Urging Member]

As shown in FIG. 3, each of the plural pairs of urging members 54 is configured to urge each roller 53 toward the outer race 51, while circumferentially interposing each roller 53 therebetween. Each urging member 54 is held by the holding member 55. For example, each urging member 54 may be made in the form of a plate spring or coil spring. Thus, each pair of urging members 54 urges each roller 53 toward the disengaged state.

[Cam Mechanism]

The cam mechanism 56 is configured to cause each roller 53 to come into mesh between the inner race 52 and the outer race 51 when the outer race 51 is rotated relative to the holding member 55. Specifically, the cam mechanism 56 includes the cam surfaces 512 provided on the inner peripheral surface of the outer race 51.

<Controller>

As shown in FIG. 1, the controller 6 is configured to control the main electric motor 2 and the auxiliary electric motor 4. For example, a computer (e.g., microcomputer), including a CPU (Central Processing Unit), a ROM (Read Only Memory), and so forth, is provided as the controller 6. The ROM stores programs for various computations. The CPU executes the programs stored in the ROM.

Figure 6:
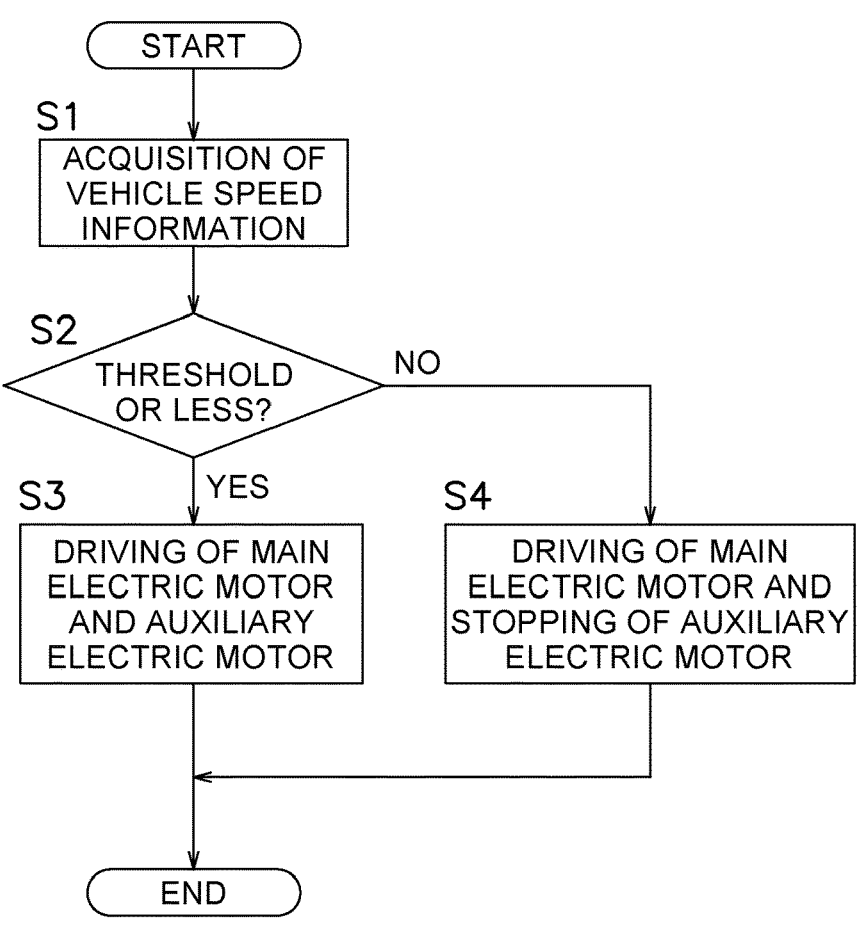
FIG. 6 is a flowchart exemplifying a control method executed by a controller.

FIG. 6 is a flowchart exemplifying a control method executed by the controller 6. As shown in FIG. 6, the controller 6 obtains vehicle speed information regarding vehicle speed from a vehicle speed sensor or so forth when a driver of the vehicle performs an acceleration operation (step S1). The controller 6 determines whether or not the vehicle speed is less than or equal to a threshold based on the vehicle speed information (step S2).

When the vehicle speed is determined to be less than or equal to the threshold (Yes in step S2), the controller 6 drives the main electric motor 2 and the auxiliary electric motor 4 (step S3). It should be noted that the controller 6 may drive only the auxiliary electric motor 4 without driving the main electric motor 2.

When the controller 6 drives the auxiliary electric motor 4 as described above in forward movement, the auxiliary electric motor 4 outputs the torque used for forward rotation, whereby the outer race 51 is forwardly rotated. In this case, the holding member 55 will be made slower in rotational speed than the outer race 51 due to inertia; hence, the outer race 51 will be forwardly rotated relative to the holding member 55. Accordingly, as shown in FIG. 4, each roller 53 transitions from the disengaged state to the engaged state and is in mesh between the outer race 51 and the inner race 52. As a result, the outer race 51 and the inner race 52 are forwardly rotated in a unitary manner. In other words, the torque is transmitted from the outer race 51 to the inner race 52 through each roller 53. Therefore, the clutch 5 allows transmission of the torque from the auxiliary electric motor 4 to the shaft 3 when the torque is intended for forward rotation.

It should be noted that in rearward movement, when the controller 6 drives the auxiliary electric motor 4, the auxiliary electric motor 4 outputs the torque intended for reverse rotation, whereby the outer race 51 is rotated in the reverse direction. Here, too, the holding member 55 will be made slower in rotational speed than the outer race 51 due to inertia; hence, the outer race 51 will be reversely rotated relative to the holding member 55. Accordingly, as shown in FIG. 5, each roller 53 transitions from the disengaged state to the engaged state and is in mesh between the outer race 51 and the inner race 52. As a result, the outer race 51 and the inner race 52 are reversely rotated in a unitary manner. In other words, the torque is transmitted from the outer race 51 to the inner race 52 through each roller 53. Therefore, the clutch 5 allows transmission of the torque from the auxiliary electric motor 4 to the shaft 3 when the torque is used for reverse rotation as well as for forward rotation.

On the other hand, when the vehicle speed is determined to be greater than the threshold (No in step S2), the controller 6 drives the main electric motor 2 while stopping the auxiliary electric motor 4 (step S4). In such a condition that the main electric motor 2 is driven while the auxiliary electric motor 4 is stopped, each roller 53 transitions to the disengaged state as shown in FIG. 3; namely, each roller 53 comes out of engagement between the outer race 51 and the inner race 52. Because of this, for instance, even when the shaft 3 is forwardly or reversely rotated by the torque inputted thereto from the main electric motor 2, only the inner race 52 is rotated, whereas the outer race 51 is not rotated. In other words, the clutch 5 blocks transmission of the torque from the shaft 3 to the auxiliary electric motor 4. As a result, the auxiliary electric motor 4 can be prevented from being rotated at a high speed, whereby the back electromotive voltage thereof can be prevented from undesirably exceeding the maximum rated voltage.

[Modifications]

One preferred embodiment of the present invention has been explained above. However, the present invention is not limited to the above, and a variety of changes can be made without departing from the scope of the claimed invention. It should be noted that basically speaking, respective modifications to be described are applicable simultaneously.

(a) In the preferred embodiment described above, an electric motor has been exemplified as the drive source; however, the drive source may be any suitable component other than an electric motor and may be, for instance, an engine or so forth.

Figure 7:
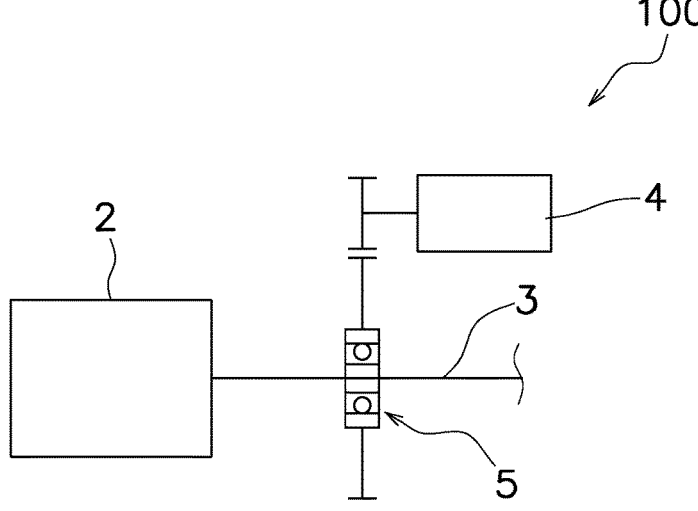
FIG. 7 is a schematic diagram of a drive unit according to a modification.

(b) In the preferred embodiment described above, the auxiliary electric motor 4 is disposed to be coaxial to the main electric motor 2; however, the layout of the auxiliary electric motor 4 is not limited to this. For example, as shown in FIG. 7, the auxiliary electric motor 4 may be disposed not to be coaxial to the main electric motor 2. In other words, the rotational axis of the auxiliary electric motor 4 is disposed not to overlap with that of the main electric motor 2. In this case, the auxiliary electric motor 4 transmits the torque to the shaft 3 through a gear, chain, or belt and the clutch 5.

Figure 8:
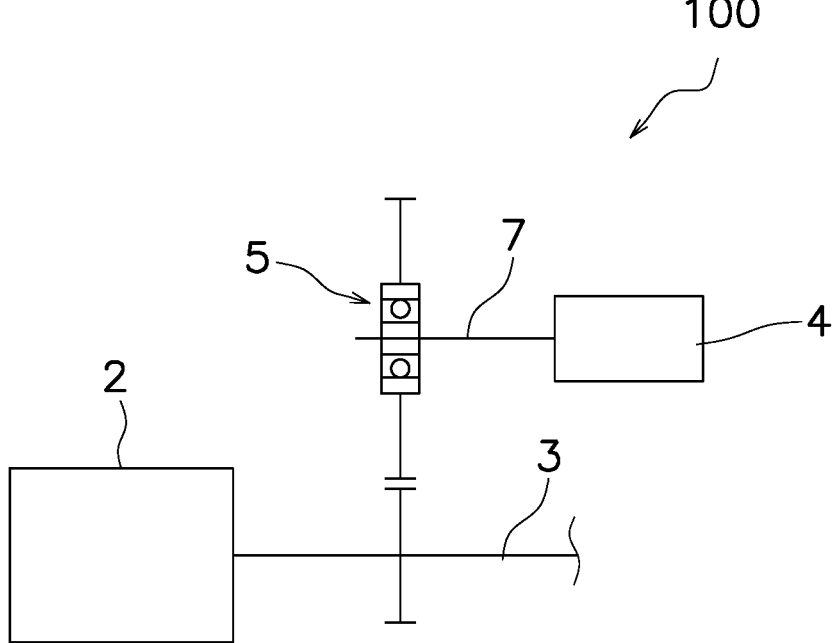
FIG. 8 is a schematic diagram of a drive unit according to another modification.

(c) In the preferred embodiment described above, the clutch 5 is directly attached to the shaft 3; however, the location of the clutch 5 is not limited to this. Any suitable layout is applicable to the clutch 5 so long as the clutch 5 is disposed between the shaft 3 and the auxiliary electric motor 4; for example, as shown in FIG. 8, the clutch 5 may be attached to a shaft 7, which is different from the shaft 3, and so forth.

Figure 9:
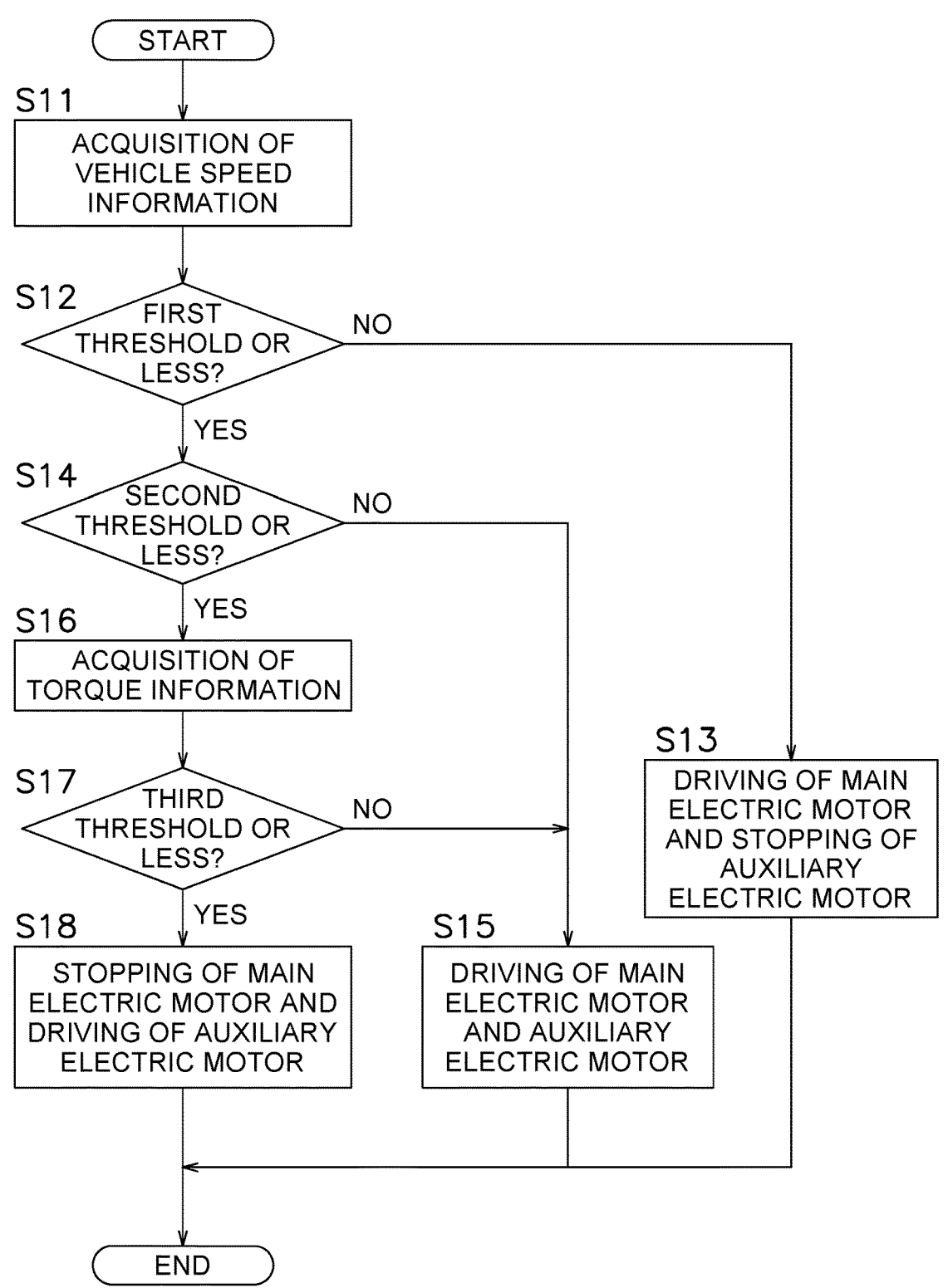
FIG. 9 is a flowchart exemplifying a control method of a controller according to yet another modification.

(d) The control method executed by the controller 6 is not limited to that explained in the preferred embodiment described above. FIG. 9 is a flowchart exemplifying a control method executed by the controller 6 according to a modification. As shown in FIG. 9, the controller 6 obtains vehicle speed information (step S11). Then, the controller 6 determines whether or not the vehicle speed is less than or equal to a first threshold based on the vehicle speed information (step S12). When the vehicle speed is determined to be not less than or equal to the first threshold (No in step S12), the controller 6 drives the main electric motor 2, while stopping the auxiliary electric motor 4 (step S13).

On the other hand, when the vehicle speed is determined to be less than or equal to the first threshold (Yes in step S12), the controller 6 next determines whether or not the vehicle speed is less than or equal to a second threshold (step S14). When it is determined that the vehicle speed is not less than or equal to the second threshold (No in step S14), the controller 6 drives the main electric motor 2 and the auxiliary electric motor 4 (step S15).

When it is determined that the vehicle speed is less than or equal to the second threshold (Yes in step S14), the controller 6 obtains required torque information (step S16). It should be noted that the required torque information indicates information regarding a required torque and is exemplified by the amount of pressing down an accelerator pedal or so forth. The controller 6 determines whether or not the required torque is less than or equal to a third threshold based on the required torque information (step S17).

When it is determined that the required torque is not less than or equal to the third threshold (No in step S17), the controller 6 executes the aforementioned processing in step S15. On the other hand, when it is determined that the required torque is less than or equal to the third threshold (Yes in step S17), the controller 6 stops the main electric motor 2, while driving the auxiliary electric motor 4 (step S18).

Reference Signs List

2: Main electric motor
3: Shaft
4: Auxiliary electric motor
5: Clutch
51: Outer race
52: Inner race
53: Roller
54: Urging member
55: Holding member
6: Controller
7: Shaft
100: Drive unit

What is claimed is:

1. A drive unit, comprising:

a drive source;

a shaft configured to transmit torque outputted from the drive source;

an auxiliary electric motor; and a clutch disposed between the shaft and the auxiliary electric motor, the clutch configured to allow transmission of mechanical power from the auxiliary electric motor to the shaft regardless of whether the mechanical power is used for forward rotation or reverse rotation, the clutch configured so as not to transmit torque from the shaft to the auxiliary electric motor regardless of whether the torque is intended for forward rotation or reverse rotation, the clutch including an input rotary member configured to receive the mechanical power inputted thereto from the auxiliary electric motor, an output rotary member configured to output the mechanical power to the shaft, the output rotary member disposed radially away from the input rotary member at an interval, and a transmission member disposed between the input rotary member and the output rotary member, the transmission member being configured to be set in a disengaged state and an engaged state, the transmission member being spaced from the output rotary member when set in the disengaged state and the transmission member being in mesh with the input rotary member and the output rotary member when set in the engaged state, and wherein the transmission member is set in the engaged state when the input rotary member is rotated relative thereto.

2. The drive unit according to claim 1, wherein the drive source is a main electric motor.

3. The drive unit according to claim 2, wherein the auxiliary electric motor has characteristics of being lower in maximum rotational speed and larger in maximum torque than the main electric motor.

4. The drive unit according to claim 1, wherein the auxiliary electric motor is disposed to be coaxial to the drive source.

5. The drive unit according to claim 1, wherein the auxiliary electric motor is disposed not to be coaxial to the drive source.

6. The drive unit according to claim 1, further comprising a controller configured to control the drive source and the auxiliary electric motor, wherein the controller drives at least the auxiliary electric motor when a vehicle speed is less than or equal to a threshold, and the controller drives the drive source while stopping the auxiliary electric motor when the vehicle speed is greater than the threshold.

7. The drive unit according to claim 1, further comprising a controller configured to control the drive source and the auxiliary electric motor, wherein the controller drives the drive source and the auxiliary electric motor when a vehicle speed is less than or equal to a first threshold, the controller driving the drive source while stopping the auxiliary electric motor when the vehicle speed is greater than the first threshold, the controller stopping the drive source while driving the auxiliary electric motor when the vehicle speed is less than or equal to a second threshold less than the first threshold and simultaneously when a required torque is less than or equal to a third threshold.

8. The drive unit according to claim 1, wherein the clutch includes an urging member that urges the transmission member toward the disengaged state.

9. The drive unit according to claim 1, wherein the clutch includes a holding member disposed between the input rotary member and the output rotary member, the holding member being rotatable relative to the input rotary member and the output rotary member, the holding member holding the transmission member.

10. The drive unit according to claim 8, wherein the clutch includes a holding member disposed between the input rotary member and the output rotary member, the holding member being rotatable relative to the input rotary member and the output rotary member, the holding member holding the transmission member.

11. A drive unit, comprising:

a drive source that outputs torque;

a shaft configured to deliver the torque from the drive source in forward and reverse rotational directions;

an auxiliary electric motor that outputs mechanical power in forward and reverse rotational directions; and a clutch disposed between the shaft and the auxiliary electric motor, wherein the clutch is configured to transmit to the shaft the mechanical power output from the auxiliary electric motor in both the forward and reverse rotational directions of the auxiliary electric motor, and wherein the clutch is configured not to transmit torque from the shaft to the auxiliary electric motor when the torque is being delivered from the drive source in the forward rotational direction of the shaft and when the torque of being delivered from the drive source in the reverse rotational direction of the shaft, the clutch including an input rotary member configured to receive the mechanical power inputted thereto from the auxiliary electric motor, an output rotary member configured to output the mechanical power to the shaft, the output rotary member disposed radially away from the input rotary member at an interval, and a transmission member disposed between the input rotary member and the output rotary member, the transmission member being configured to be set in a disengaged state and an engaged state, the transmission member being spaced from the output rotary member when set in the disengaged state and the transmission member being in mesh with the input rotary member and the output rotary member when set in the engaged state, and wherein the transmission member is set in the engaged state when the input rotary member is rotated relative thereto.

* * * * *